United States Patent
Yang

(10) Patent No.: US 7,551,015 B2
(45) Date of Patent: Jun. 23, 2009

(54) OPERATING FREQUENCY GENERATING METHOD AND CIRCUIT FOR SWITCHING VOLTAGE CONVERTER

(75) Inventor: Yueh-Lin Yang, Hsinchu (TW)

(73) Assignee: Wisepal Technologies, Inc., Miao-Li (TW)

( * ) Notice: Subject to any disclaimer, the term of this patent is extended or adjusted under 35 U.S.C. 154(b) by 186 days.

(21) Appl. No.: 11/551,965

(22) Filed: Oct. 23, 2006

(65) Prior Publication Data

US 2008/0061845 A1 Mar. 13, 2008

(30) Foreign Application Priority Data

Sep. 12, 2006 (TW) ............................... 95133610 A

(51) Int. Cl.
*H03H 11/26* (2006.01)
(52) U.S. Cl. ...................................... 327/261; 327/265
(58) Field of Classification Search ................... 327/99, 327/298, 293, 261, 264, 265, 271–273, 284–286
See application file for complete search history.

(56) References Cited

U.S. PATENT DOCUMENTS

| | | | | |
|---|---|---|---|---|
| 4,540,944 A | * | 9/1985 | Watanabe | .................... 327/101 |
| 5,670,904 A | * | 9/1997 | Moloney et al. | ............. 327/277 |
| 5,909,133 A | * | 6/1999 | Park | ............................ 327/277 |
| 6,329,861 B1 | * | 12/2001 | Francis | ........................ 327/291 |
| 6,737,904 B1 | * | 5/2004 | Butaud et al. | ................ 327/298 |
| 6,861,881 B1 | * | 3/2005 | Neravetla et al. | ............ 327/115 |
| 7,288,979 B2 | * | 10/2007 | Yoneda | ........................ 327/291 |
| 7,336,116 B2 | * | 2/2008 | Hirata et al. | ................. 327/293 |

FOREIGN PATENT DOCUMENTS

JP 05-216436 8/1993

* cited by examiner

*Primary Examiner*—Lincoln Donovan
*Assistant Examiner*—Hai L. Nguyen
(74) *Attorney, Agent, or Firm*—J.C. Patents

(57) ABSTRACT

An operating frequency generating method and circuit for a switching voltage converter are provided. The method includes the following steps. First, a reference clock signal and a digital period signal are received. The phase of the digital period signal is delayed according to at least one different delay time, so as to generate at least one delay period signal. The digital period signal or one of the delay period signals is selected as an operating frequency of the switching voltage converter at every predetermined time interval.

9 Claims, 4 Drawing Sheets

OPERATING FREQUENCY GENERATING METHOD AND CIRCUIT FOR SWITCHING VOLTAGE CONVERTER

CROSS-REFERENCE TO RELATED APPLICATION

This application claims the priority benefit of Taiwan application serial no. 95133610, filed on Sep. 12, 2006. All disclosure of the Taiwan application is incorporated herein by reference.

BACKGROUND OF THE INVENTION

1. Field of Invention

The present invention relates to an operating frequency generating method and circuit for a switching voltage converter. More particularly, the present invention relates to an operating frequency generating method and circuit for a switching voltage converter capable of eliminating water wave, mura, flicker phenomena, etc. of liquid crystal display (LCD).

2. Description of Related Art

Among driving circuits of a display, for example a source driver and a gate driver of LCD, requires a switching voltage converter to generate the voltage required by the source driver and the gate driver. The switching voltage converters are mainly classified into two types, namely charge pump converters and pulse width modulation converters.

Generally speaking, the switching voltage converter must receive one clock signal serving as an operating frequency of its internal switch. The clock signal mainly comes from two sources: an independent voltage-controlled oscillator (VCO) and a certain digital period signal e.g. a dot clock signal, a horizontal synchronous signal, or a horizontal start pulse (or STH) signal in the driving circuit. The operating frequency of the switching voltage converter can directly adopt the clock signal coming from the above sources, or can be obtained by dividing the frequency of the signal coming from the above sources.

FIG. 1 is a clock diagram of a conventional switching voltage converter clock signal and a horizontal synchronous signal, vertical synchronous signal, and dot clock signal. In FIG. 1, Hsync represents the horizontal synchronous signal, Vsync represents the vertical synchronous signal, DOTCLK represents the dot clock signal, and CPCK represents the switching voltage converter clock signal.

When the switching voltage converter operates, the switching of the internal switch usually produces noises, which easily interferes the power supply voltage and other control signals of the driving circuit of display. As the operating frequency of the switching voltage converter and the control signal of the driving circuit have the visible timing correlation, many display defects e.g. water wave, mura, or flicker etc. are generated on the display.

Therefore, an operating frequency generating circuit and method for a switching voltage converter are required to solve the above problem.

SUMMARY OF THE INVENTION

The present invention is directed to an operating frequency generating method and circuit for a switching voltage converter capable of eliminating the water wave, mura, and flicker phenomena etc. of the display.

In accordance with the above and other objectives, the present invention provides an operating frequency generating method for a switching voltage converter. The method comprises: receiving a reference clock signal and a digital period signal; delaying the phase of the digital period signal according to at least one different delay time, so as to generate at least one delay period signal; and selecting the digital period signal or one of the delay period signals as an operating frequency of the switching voltage converter at every predetermined time interval.

In accordance with the above and other objectives, the present invention provides an operating frequency generating circuit for a switching voltage converter, which comprises a delay circuit and a select circuit. The delay circuit is used to receive a reference clock signal and a digital period signal, and delay the phase of the digital period signal according to the reference clock signal, so as to generate at least one delay period signal. The select circuit is used to receive the digital period signal and the delay period signals, and selectively output the digital period signal or one of the delay period signals, so as to serve as the operating frequency of the switching voltage converter.

In an embodiment of the present invention, the delay time is in a multiple relationship with another delay time.

In an embodiment of the present invention, the step of selecting the digital period signal or one of the delay period signals as an operating frequency of the switching voltage converter at every predetermined time interval comprises selecting the digital period signal or one of the delay period signals sequentially by means of a predetermined sequence.

In an embodiment of the present invention, the step of selecting the digital period signal or one of the delay period signals as an operating frequency of the switching voltage converter at every predetermined time interval comprises selecting the digital period signal or one of the delay period signals circularly by means of a random number.

In an embodiment of the present invention, the delay circuit comprises a first flip-flop. The first flip-flop has an input end and a clock input end respectively receiving the digital period signal and the reference clock signal, so as to output a first delay period signal, wherein the rising edge of the first delay period signal is synchronous with a first edge of the reference clock signal.

In an embodiment of the present invention, the delay circuit further comprises a second flip-flop. The second flip-flop has an input end and a clock input end respectively receiving the first delay period signal and the reference clock signal, so as to output a second delay period signal, wherein the rising edge of the second delay period signal is synchronous with the first edge of the reference clock signal.

In another embodiment of the present invention, in addition to the first flip-flop, the delay circuit further comprises a second flip-flop. The second flip-flop has an input end and a clock input end respectively receiving the digital period signal and the reference clock signal, so as to output a second delay period signal, wherein the rising edge of the second delay period signal is synchronous with a second edge of the reference clock signal.

In another embodiment of the present invention, the delay circuit further comprises a third flip-flop. The third flip-flop has an input end and a clock input end respectively receiving the second delay period signal and the reference clock signal, so as to output a third delay period signal, wherein the rising edge of the third delay period signal is synchronous with the second edge of the reference clock signal.

In an embodiment of the present invention, the first edge is a rising edge and the second edge is a falling edge.

In another embodiment of the present invention, the first edge is a falling edge and the second edge is a rising edge.

In an embodiment of the present invention, the select circuit performs selection according to a select signal.

In an embodiment of the present invention, the select circuit comprises a multiplexer. The multiplexer has a plurality of input ends to receive the digital period signal and the delay period signals and a select end to receive the select signal. The multiplexer outputs the digital period signal or one of the delay period signals according to the select signal.

In an embodiment of the present invention, the select signal is provided by a counting circuit.

In an embodiment of the present invention, the counting circuit circularly generates the select object of the select signal by means of the random number.

In an embodiment of the present invention, the counting circuit generates the select object of the select signal sequentially by means of the predetermined sequence.

In the present invention, the phase of the clock signal (i.e. the digital period signal) to be received by the switching voltage converter is shifted, so as to generate at least one delay period signal. Then, the digital period signal or one of the delay period signals is circularly selected to serve as the operating frequency of the switching voltage converter, i.e. the phase of the clock signal received by the switching voltage converter is continuously changed, such that the noises generated during the switching of the internal switch of the switching voltage converter can be evenly distributed in every horizontal and vertical display period, thereby eliminating the water wave, mura, or flicker phenomena on the display.

In order to the make aforementioned and other objects, features and advantages of the present invention comprehensible, preferred embodiments accompanied with figures are described in detail below.

DESCRIPTION OF EMBODIMENTS

Figure 1:
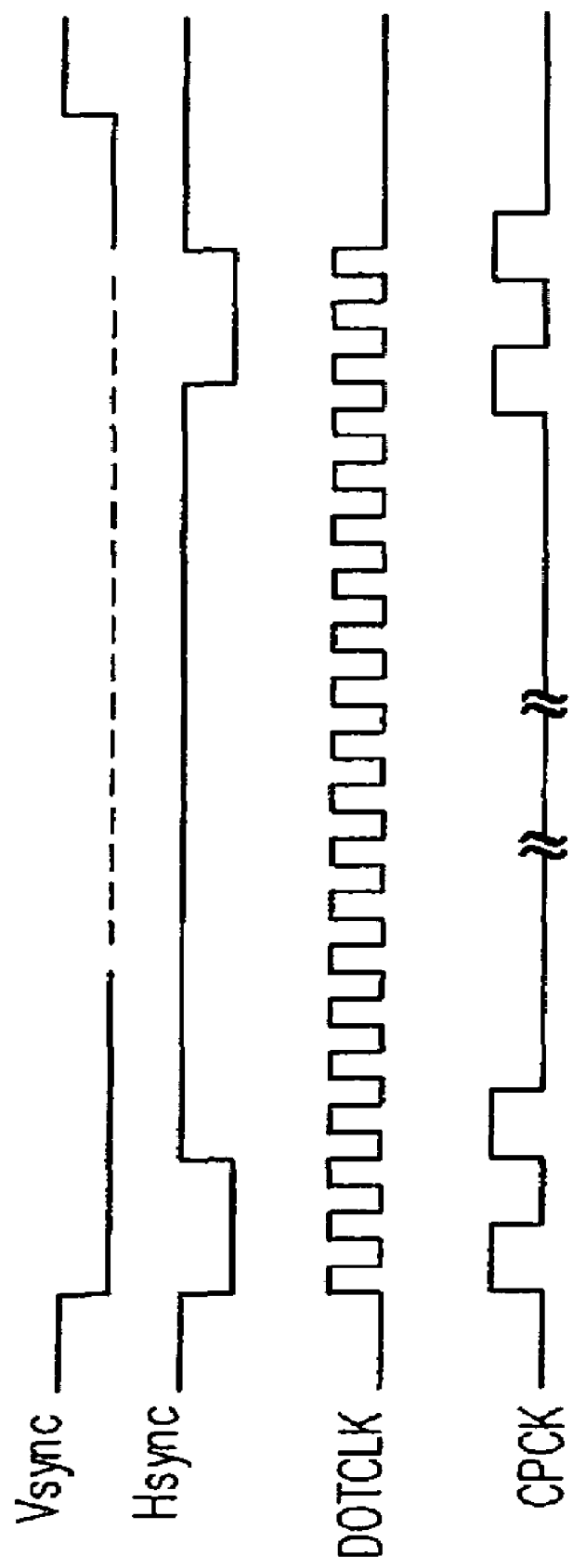
FIG. 1 is a clock diagram of a conventional switching voltage converter clock signal and a horizontal synchronous signal, vertical synchronous signal, and dot clock signal.
Figure 2:
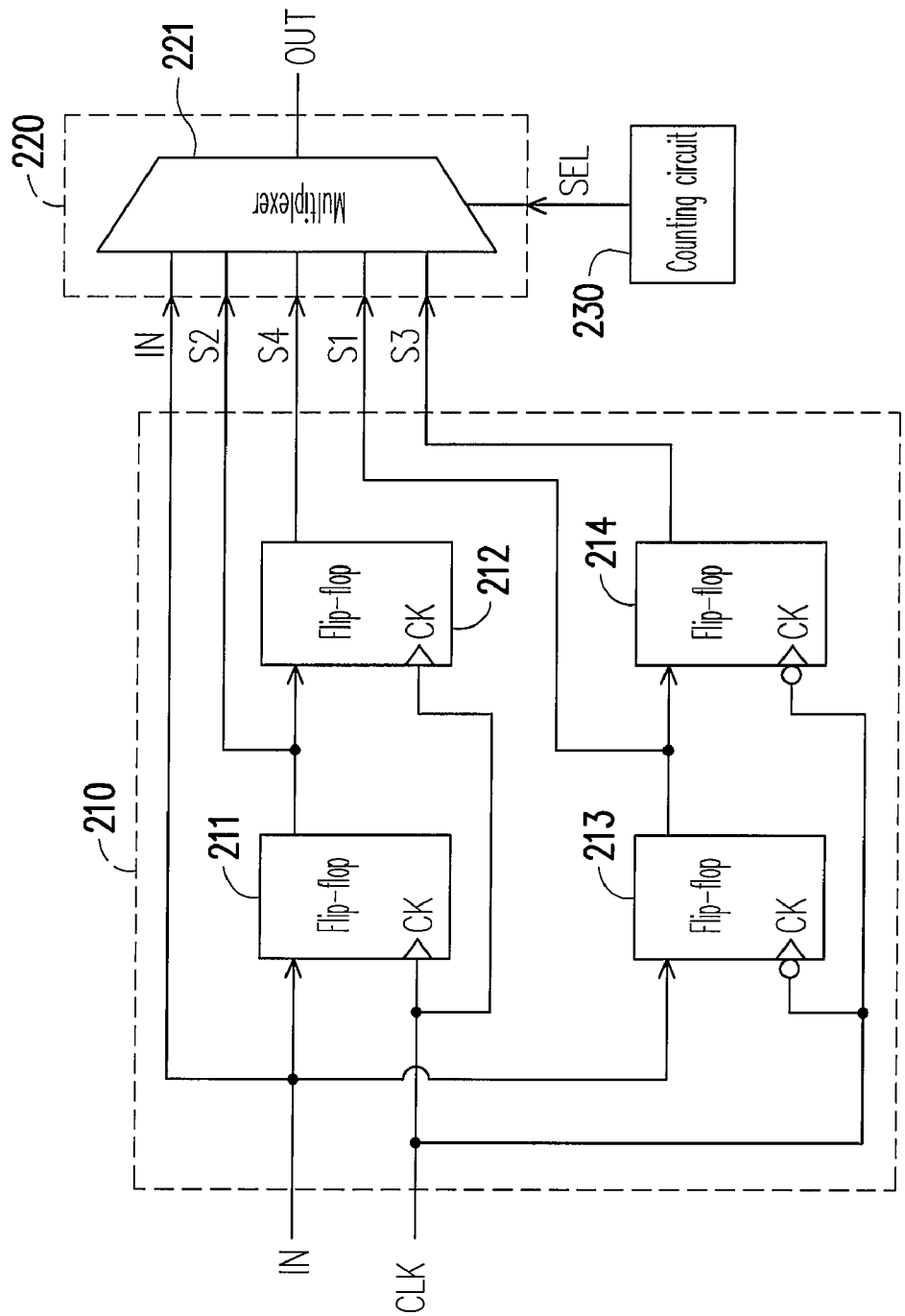
FIG. 2 is a circuit diagram of the operating frequency generating circuit according to an embodiment of the present invention.
Figure 3:
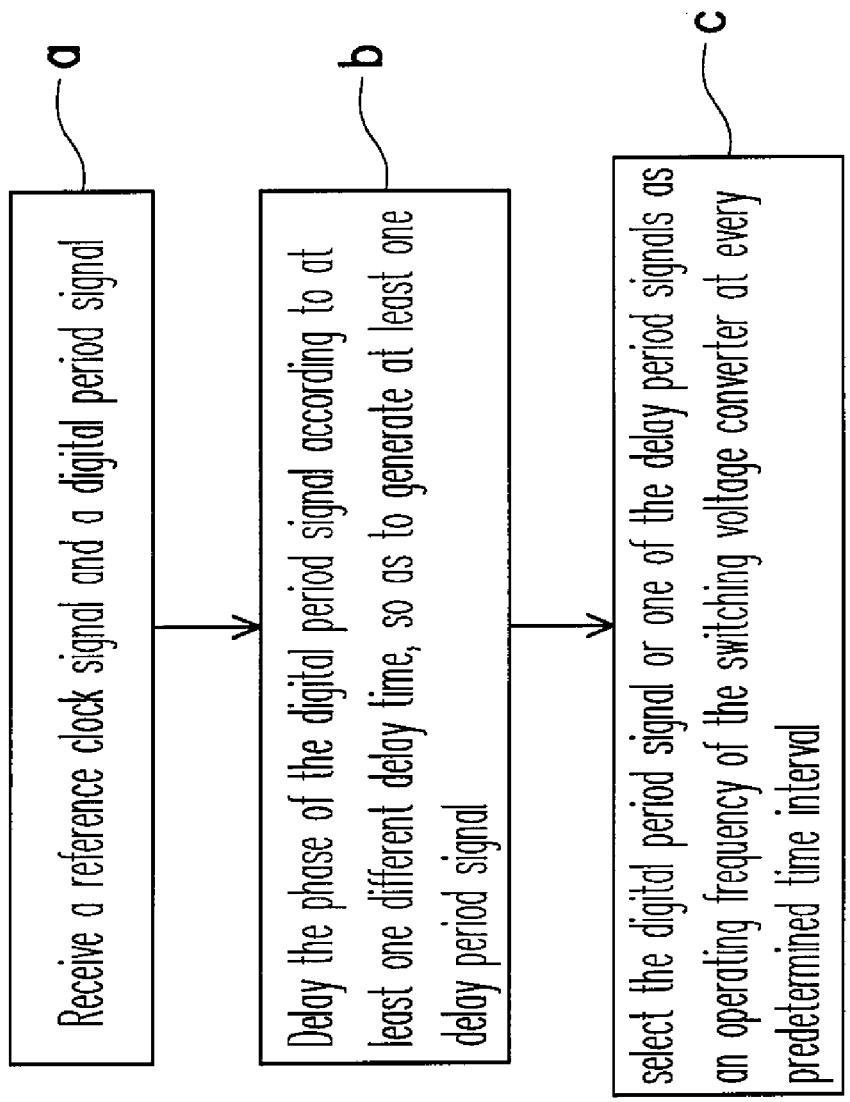
FIG. 3 is a flow chart of the operating frequency generating method according to an embodiment of the present invention.

FIG. 2 is a circuit diagram of the operating frequency generating circuit according to an embodiment of the present invention. FIG. 3 is a flow chart of the operating frequency generating method according to an embodiment of the present invention. The circuit of FIG. 2 and the processes of the method of FIG. 3 when used to generate the operating frequency of the switching voltage converter, phenomena such as water wave, mura, or flicker on the display may be eliminated. The function of the present invention will be illustrated below with reference to FIGS. 2 and 3.

First, referring to FIG. 2, the circuit as shown in FIG. 2 includes a delay circuit 210, a select circuit 220, and a counting circuit 230. The delay circuit 210 is used to receive a reference clock signal CLK and a digital period signal IN (step a of FIG. 3), and delay the phase of the digital period signal IN (i.e. delay the time of the digital period signal IN) according to the reference clock signal CLK, so as to generate at least one delay period signal. The delay time of the generated delay period signals is different (step b of FIG. 3). The digital period signal IN denotes the working clock signal of the conventional switching voltage converter. Further, the above reference clock signal CLK is particularly limited to be larger than the frequency of the digital period signal IN.

The select circuit 220 is used to receive the digital period signal IN, the delay period signal, and the select signal SEL output by the counting circuit 230, and selectively output the digital period signal IN or one of the delay period signals according to the select signal SEL, so as to serve as the operating frequency of the switching voltage converter. The OUT denotes the output end of the select circuit 220, which is used to couple to the switching voltage converter to provide the operating frequency of the switching voltage converter.

The delay circuit 210 of this embodiment is realized by two positive edge-triggered D-type flip-flops 211 and 212, and two negative edge-triggered D-type flip-flops 213 and 214. The digital period signal IN performs signal delay through the flip-flops 211 and 213, so as to respectively generate delay period signals S2 and S1. Then, the flip-flops 212 and 214 respectively receive the delay period signals S2 and S1 and perform a signal delay once more, so as to respectively generate delay period signals S4 and S3. The timings of those signals are shown in FIG. 4.

Figure 4:
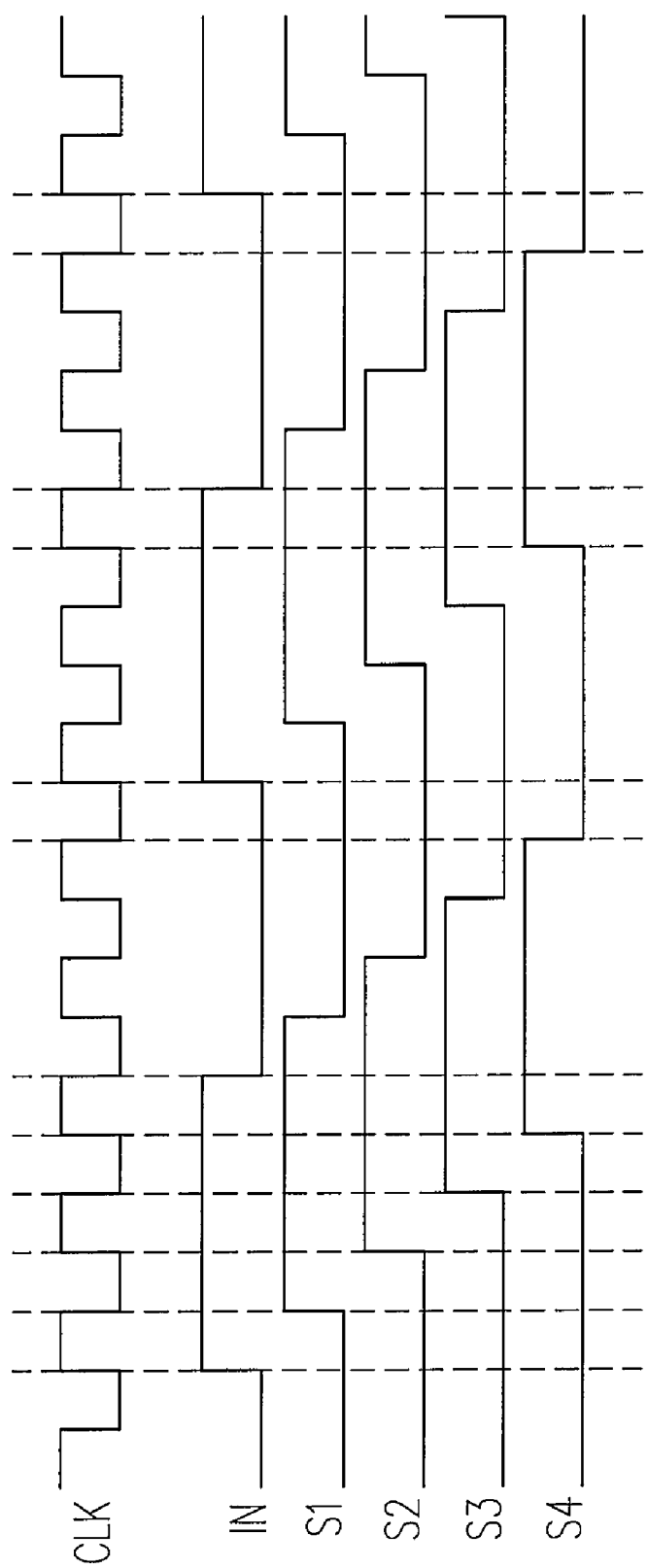
FIG. 4 is a timing chart of the digital period signal and the delay period signal according to an embodiment of the present invention.

FIG. 4 is a timing chart of the digital period signal and the delay period signal according to an embodiment of the present invention. The CLK and IN respectively denote the timings of the reference clock signal and the digital period signal, and S1, S2, S3, and S4 denotes the timing of each delay period signal. As the delay period signals S2 and S4 are respectively output signals of the positive edge-triggered flip-flops 211 and 212, the rising edges of the delay period signals S2 and S4 may be synchronous with the rising edge of the reference clock signal CLK. As the delay period signals S1 and S3 are respectively the output signals of the negative edge-triggered flip-flops 213 and 214, the rising edges of the delay period signals S1 and S3 may be synchronous with the falling edge of the reference clock signal CLK.

Referring to FIG. 2, the select circuit 220 of this embodiment is realized by a multiplexer 221 which has a plurality of input ends and a select end. An output end of the multiplexer 221 is the output end OUT of the select circuit 220. The input end is used to receive the digital period signal IN and the delay period signals S1, S2, S3, and S4 generated by the delay circuit 210, and the select end is used to receive the select signal SEL output by the counting circuit 230. The multiplexer 221 outputs the digital period signal IN and one of the delay period signals S1, S2, S3, and S4 according to the select signal SEL.

Referring to FIGS. 2 and 3, the counting circuit 230 of FIG. 2 sequentially generates the select object of the select signal SEL by means of a predetermined sequence. In this embodiment, the predetermined sequence is: digital period signal IN, delay period signal S1, delay period signal S2, delay period signal S3, and finally delay period signal S4 arranged in sequence.

The counting circuit 230 changes the select object of the select signal SEL at every predetermined time interval, so the multiplexer 221 can select the digital period signal IN or one of the delay period signals serving as the operating frequency of the switching voltage converter at every predetermined time interval (step c of FIG. 3), such that the noises generated by the switching voltage converter can be evenly distributed in every horizontal and vertical display period, thereby eliminating the water wave, mura, or flicker phenomena etc. on the display. As for the counting circuit 230, the user may use the counter to achieve the function of the counting circuit 230.

Although one possible form of the operating frequency generating circuit has been described in the above embodiments, those of ordinary skill in the art would understand that the delay circuit 210 and the counting circuit 230 can also be modified to achieve the purpose of the present invention. In other words, so long as the reference clock signal CLK and the digital period signal IN are used to generate at least one delay period signal with different delay time, and the digital period signal IN or one of the delay period signals is selected as the operating frequency of the switching voltage converter at every predetermined time interval, it will conform to the scope of the present invention. Other possible implementations will be simply illustrated below for reference.

As far as the delay circuit 210 is concerned, the user can modify the design of the internal circuit according to practical requirements, so as to provide other combination of the delay period signals with different delay time. For example, in FIG. 2, the user can use one positive edge-triggered flip-flop 211 or one negative edge-triggered flip-flop 213 independently to perform delay action. Definitely, a plurality of positive edge-triggered flip-flops or a plurality of negative edge-triggered flip-flops can be so operated. In other words, in the delay circuit 210, the number of the positive edge-triggered flip-flops and the negative edge-triggered flip-flops can be changed according to the requirements of the designer. However, the preferred design to solve the problem is as shown in FIG. 4, and the delay time of each delay period signal is in the multiple relationship with another delay period signal. Moreover, the user can also change the frequency of the reference clock signal CLK in accordance with the above changing requirements.

For the counting circuit 230, if the select object of the select signal SEL is generated sequentially by means of the predetermined sequence, the predetermined sequence is: digital period signal IN, delay period signal S2, delay period signal S1, delay period signal S3, and finally delay period signal S4 arranged in sequence, or delay period signal S2, digital period signal IN, delay period signal S1, delay period signal S4, and finally delay period signal S3 arranged in sequence, or other arrangements. Then, by continuously repeating one of the above arrangements, the delay phase of the operating frequency of the switching voltage converter can be changed.

Particularly, the counting circuit 230 of FIG. 2 can circularly generate the select object of the select signal SEL by means of the random number. The first random selecting arrangement may be: delay period signal S3, delay period signal S2, delay period signal S1, digital period signal IN, and finally delay period signal S4. The second ransom selecting arrangement may be: delay period signal S2, delay period signal S1, digital period signal IN, delay period signal S4, and finally delay period signal S3. Alternatively, the selecting arrangement can be the same as the first or the second random selecting arrangement, or some other arrangement. The user can use the random counter to realize the function of the counting circuit 230.

To sum up, in the present invention, the phase of the clock signal (i.e. the digital period signal) to be received by the switching voltage converter is shifted, so as to generate at least one delay period signal. Then, the digital period signal or one of the delay period signals is circularly selected to serve as the operating frequency of the switching voltage converter, i.e. the phase of the clock signal received by the switching voltage converter is continuously changed, such that the noises generated during the switching of the internal switch of the switching voltage converter can be evenly distributed in every horizontal and vertical display period, thereby eliminating the water wave, mura, or flicker phenomena etc. on the display.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An operating frequency generating circuit for a switching voltage converter, comprising:
    a delay circuit, for receiving a reference clock signal and a digital period signal, and delaying a phase of the digital period signal according to the reference clock signal, so as to generate at least one delay period signal, wherein the delay circuit comprises:
    a first flip-flop, having an input end and a clock input end respectively to receive the digital period signal and the reference clock signal, so as to output a first delay period signal, wherein a rising edge of the first delay period signal is synchronous with a first edge of the reference clock signal; and
    a select circuit, for receiving the digital period signal and the delay period signals, and selecting the digital period signal or one of the delay period signals for outputting as an output clock signal, so as to serve as the operating frequency of the switching voltage converter, such that the phase of the output clock signal is changed according to the select circuit.

2. The operating frequency generating circuit for a switching voltage converter as claimed in claim 1, wherein the delay circuit further comprises:
    a second flip-flop, having an input end and a clock input end for respectively receiving the first delay period signal and the reference clock signal, so as to output a second delay period signal, wherein a rising edge of the second delay period signal is synchronous with the first edge of the reference clock signal.

3. The operating frequency generating circuit for a switching voltage converter as claimed in claim 1, wherein the select circuit comprises a multiplexer, the multiplexer has a plurality of input ends to receive the digital period signal and the delay period signals and a select end to receive a select signal, and the multiplexer outputs the digital period signal or one of the delay period signals according to the select signal.

4. The operating frequency generating circuit for a switching voltage converter as claimed in claim 1, wherein a select signal is generated circularly by means of the random number.

5. The operating frequency generating circuit for a switching voltage converter as claimed in claim 1, wherein a select signal is generated sequentially by means of a predetermined sequence.

6. The operating frequency generating circuit for a switching voltage converter as claimed in claim 1, wherein the delay circuit further comprises:
    a second flip-flop, having an input end and a clock input end for respectively receiving the digital period signal and the reference clock signal, so as to output a second delay period signal, wherein the rising edge of the second delay period signal is synchronous with a second edge of the reference clock signal.

7. The operating frequency generating circuit for a switching voltage converter as claimed in claim 6, wherein the delay circuit further comprises:
 a third flip-flop, having an input end and a clock input end for respectively receiving the second delay period signal and the reference clock signal, so as to output a third delay period signal, wherein the rising edge of the third delay period signal is synchronous with the second edge of the reference clock signal.

8. The operating frequency generating circuit for a switching voltage converter as claimed in claim 7, wherein the first edge is a rising edge, and the second edge is a falling edge.

9. The operating frequency generating circuit for a switching voltage converter as claimed in claim 7, wherein the first edge is a falling edge, and the second edge is a rising edge.

* * * * *